US009932840B2

(12) United States Patent
Fulayter et al.

(10) Patent No.: US 9,932,840 B2
(45) Date of Patent: Apr. 3, 2018

(54) ROTOR FOR A GAS TURBINE ENGINE

(71) Applicant: Rolls-Royce Corporation, Indianapolis, IN (US)

(72) Inventors: Roy D. Fulayter, Avon, IN (US); Jonathan M. Rivers, Indianapolis, IN (US); Matthew Jordan, Indianapolis, IN (US); Daniel E. Molnar, Lebanon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 311 days.

(21) Appl. No.: 14/698,299

(22) Filed: Apr. 28, 2015

(65) Prior Publication Data
US 2015/0322803 A1 Nov. 12, 2015

Related U.S. Application Data

(60) Provisional application No. 61/989,786, filed on May 7, 2014.

(51) Int. Cl.
*F01D 5/02* (2006.01)
*F01D 5/26* (2006.01)
*F01D 5/14* (2006.01)
*F01D 5/10* (2006.01)
*F01D 5/16* (2006.01)

(52) U.S. Cl.
CPC ............. *F01D 5/26* (2013.01); *F01D 5/027* (2013.01); *F01D 5/10* (2013.01); *F01D 5/146* (2013.01); *F01D 5/16* (2013.01); *F05D 2220/32* (2013.01); *F05D 2260/96* (2013.01); *Y02T 50/671* (2013.01); *Y02T 50/673* (2013.01)

(58) Field of Classification Search
None
See application file for complete search history.

(56) References Cited

U.S. PATENT DOCUMENTS

| 2,916,258 | A | * | 12/1959 | Klint | F01D 5/141 |
| | | | | | 415/119 |
| 4,097,192 | A | * | 6/1978 | Kulina | F01D 5/16 |
| | | | | | 416/175 |
| 4,497,613 | A | * | 2/1985 | Carreno | F01D 5/16 |
| | | | | | 416/228 |

(Continued)

FOREIGN PATENT DOCUMENTS

| EP | 1211382 A2 | 6/2002 |
| EP | 1211383 A2 | 6/2002 |

(Continued)

OTHER PUBLICATIONS

European Search Report Application Serial No. EP15164164, completed Jan. 10, 2015, (6 pages).

(Continued)

*Primary Examiner* — Woody Lee, Jr.
*Assistant Examiner* — Theodore Ribadeneyra
(74) *Attorney, Agent, or Firm* — Barnes & Thornburg LLP

(57) ABSTRACT

A rotor for a gas turbine engine includes a central wheel and a plurality of blades that extend outwardly from the central wheel. The blades are non-uniform to reduce flutter and forced response effects induced during operation of a gas turbine engine including the rotor.

9 Claims, 2 Drawing Sheets

(56) References Cited

U.S. PATENT DOCUMENTS

| | | | |
|---|---|---|---|
| 4,878,810 A * | 11/1989 | Evans | F01D 5/16 |
| | | | 416/175 |
| 5,299,914 A | 4/1994 | Schilling | |
| 5,667,361 A | 9/1997 | Yaeger et al. | |
| 5,988,982 A | 11/1999 | Clauer | |
| 6,042,338 A | 3/2000 | Brafford et al. | |
| 6,428,278 B1 | 8/2002 | Montgomery et al. | |
| 6,471,482 B2 | 10/2002 | Montgomery et al. | |
| 6,478,544 B2 | 11/2002 | Brandl et al. | |
| 7,033,131 B2 * | 4/2006 | Schreiber | F01D 5/147 |
| | | | 415/119 |
| 7,147,437 B2 * | 12/2006 | Burdgick | F01D 5/147 |
| | | | 416/1 |
| 7,251,888 B2 * | 8/2007 | Schreiber | F01D 5/147 |
| | | | 29/889.72 |
| 7,396,208 B1 | 7/2008 | Hussain | |
| 7,500,299 B2 | 3/2009 | Dupeux et al. | |
| 8,043,063 B2 | 10/2011 | Kelly et al. | |
| 8,167,540 B2 | 5/2012 | Schlinker et al. | |
| 8,241,003 B2 | 8/2012 | Roberge | |
| 8,469,670 B2 | 6/2013 | Fulayter et al. | |
| 8,573,945 B2 | 11/2013 | Wang et al. | |
| 8,656,589 B2 | 2/2014 | Kurt-Elli | |
| 2002/0064458 A1 | 5/2002 | Montgomery et al. | |
| 2007/0036658 A1 | 2/2007 | Morris | |
| 2007/0175032 A1 | 8/2007 | Kurt-Elli | |
| 2011/0052398 A1 | 3/2011 | Fulayter et al. | |
| 2012/0126665 A1 * | 5/2012 | Szwedowicz | F01D 5/16 |
| | | | 310/319 |
| 2013/0064676 A1 | 3/2013 | Salisbury et al. | |
| 2013/0111907 A1 | 5/2013 | Murdock | |
| 2013/0149108 A1 | 6/2013 | Webster | |
| 2013/0195674 A1 | 8/2013 | Watson et al. | |
| 2014/0050590 A1 | 2/2014 | Ghorbani et al. | |
| 2014/0112769 A1 * | 4/2014 | Schoenenborn | F01D 5/16 |
| | | | 415/185 |

FOREIGN PATENT DOCUMENTS

| | | |
|---|---|---|
| EP | 1626161 A1 | 2/2006 |
| EP | 2589781 A2 | 5/2013 |
| EP | 2725193 A1 | 4/2014 |

OTHER PUBLICATIONS

European Search Report of related EP 15 16 4164, dated Sep. 23, 2015, 6 pages.

* cited by examiner

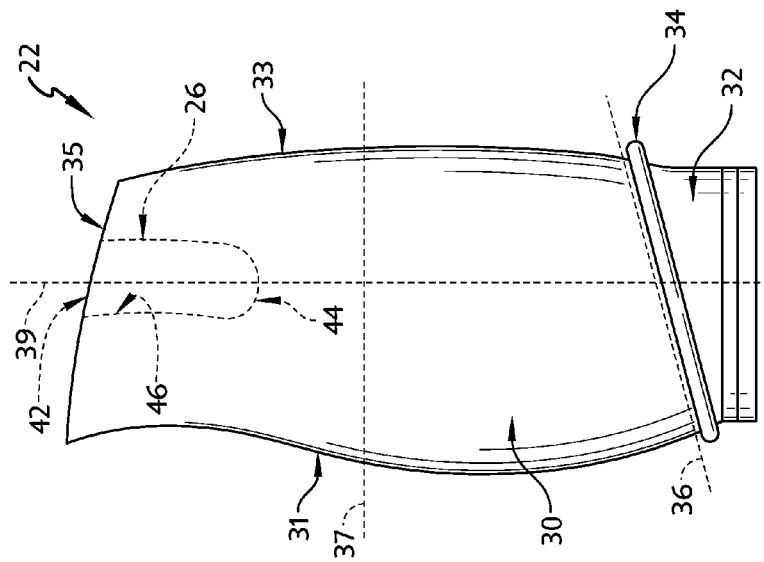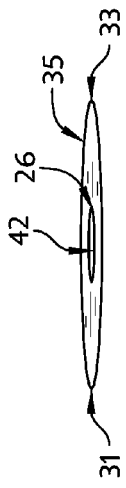
FIG. 4  FIG. 5
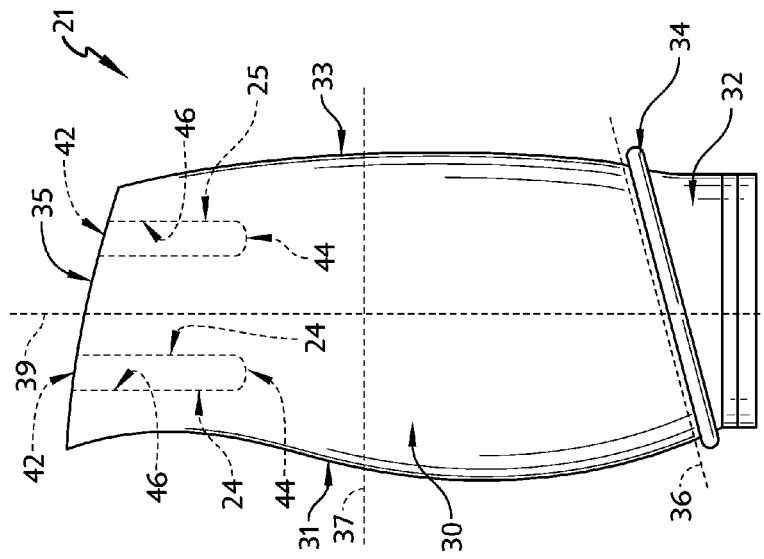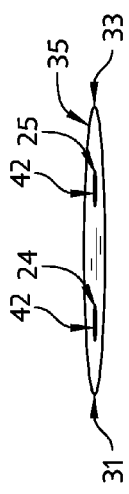
FIG. 2  FIG. 3

ROTOR FOR A GAS TURBINE ENGINE

CROSS REFERENCE TO RELATED APPLICATIONS

This application claims priority to and the benefit of U.S. Provisional Patent Application No. 61/989,786, filed May 7, 2014, the disclosure of which is now expressly incorporated herein by reference.

BACKGROUND

Gas turbine engines are used to power aircraft, watercraft, power generators, pumps, and the like. Gas turbine engines operate by compressing atmospheric air, burning fuel with the compressed air, and then removing work from hot high-pressure air produced by combustion of the fuel in the air. Rows of rotating blades and non-rotating vanes are used to compress the air and then to remove work from the high-pressure air produced by combustion. Each blade and vane has an airfoil that interacts with the gasses as they pass through the engine.

Airfoils have natural vibration modes of increasing frequency and complexity of the mode shape. The simplest and lowest frequency modes are typically referred to as the first bending mode, the second bending mode, the third bending mode, and the first torsion mode. The first bending mode is a motion normal to the working surface of an airfoil in which the entire span of the airfoil moves in the same direction. The second bending mode is similar to the first bending mode, but with a change in the sense of the motion somewhere along the span of the airfoil, so that the upper and lower portions of the airfoil move in opposite directions. The third bending mode is similar to the second bending mode, but with two changes in the sense of the motion somewhere along the span of the airfoil. The first torsion mode is a twisting motion around an elastic axis, which is parallel to the span of the airfoil, in which the entire span of the airfoil, on each side of the elastic axis, moves in the same direction.

Blades are subject to destructive vibrations induced by unsteady interaction of the airfoils of those blades with gasses passing through a gas turbine engine. One type of vibration is known as flutter, which is an aero-elastic instability resulting from the interaction of the flow over the airfoils of the blades and the blades' natural vibration tendencies. The lowest frequency vibration modes, the first bending mode and the first torsion mode, are often the vibration modes that are susceptible to flutter. When flutter occurs, the unsteady aerodynamic forces on the blade, due to its vibration, add energy to the vibration, causing the vibration amplitude to increase. The vibration amplitude can become large enough to cause damage to a blade. Another type of vibration is known as forced response, which is an aero-elastic response to inlet distortion or wakes from upstream airfoils, struts, or any other flow obstruction. The operable range, in terms of pressure rise and flow rate, of turbomachinery can sometimes be restricted by flutter or forced response phenomena.

The specific susceptibility of a blade to flutter may be increased if all the blades on a rotor are identical in terms of their vibration frequencies. Sometimes, intentional variations may be introduced into blades during manufacturing to create structural mistuning of a rotor and provide flutter resistance.

The specific susceptibility of a blade to forced response may be increased if random manufacturing variations would put a blade at or near the peak amplification factor based on mistuning. Sometimes, intentional variations may be introduced into blades during manufacturing to create structural mistuning of a rotor to reduce the amplification factor due to random mistuning.

SUMMARY

The present disclosure may comprise one or more of the following features and combinations thereof.

A rotor for use in a gas turbine engine may include a central wheel, a plurality of first frequency blades, and a plurality of second frequency blades. The central wheel may be arranged around a central axis. The plurality of first frequency blades may extend outward from the central wheel in a radial direction away from the central axis. The plurality of second frequency blades may also extend outward from the central wheel in the radial direction away from the central axis; and, each of the plurality of second frequency blades may be arranged circumferentially between two first frequency blades.

In illustrative embodiments, each of the first frequency blades may be formed to include at least one first-frequency-modification slot that extends inward in the radial direction from a radially-outward tip of the first frequency blade toward the central wheel. Additionally, each of the second frequency blades may be formed to include at least one second-frequency-modification slot, different from the at least one first-frequency-modification slot, that extends inward in the radial direction from a radially-outward tip of the second frequency blade toward the central wheel.

In illustrative embodiments, the at least one first-frequency-modification slot and the at least one second-frequency-modification slot may be sized and located so that the natural frequency of one low order mode of each of the first frequency blades is not equal to the natural frequency of the same low order mode of each of the second frequency blades. Further, the at least one first-frequency-modification slot and the at least one second-frequency-modification slot may be sized and located so that the natural frequency of the other low order modes of each of the first frequency blades is substantially equal to the natural frequency of the same low order modes of each of the second frequency blades.

In illustrative embodiments, the at least one first-frequency-modification slot and the at least one second-frequency-modification slot may be sized and located so that the natural frequency of the first torsional mode of each of the first frequency blades is not equal to the natural frequency of the first torsional mode of each of the second frequency blades. In some embodiments, the at least one first-frequency-modification slot and the at least one second-frequency-modification slot may be sized and located so that the natural frequency of the first bend mode of each of the first frequency blades is not equal to the natural frequency of the first bend mode of each of the second frequency blades.

In illustrative embodiments, each of the first frequency blades may include a first airfoil having a first aerodynamic profile between a leading edge and a trailing edge of the first airfoil. Each of the second frequency blades may include a second airfoil having a second aerodynamic profile between a leading edge and a trailing edge of the second airfoil. The first aerodynamic profile may be substantially the same as the second aerodynamic profile. In some embodiments, each of the first frequency blades and each of the second frequency blades may be substantially identical except for the first-frequency-modification slots and the second-frequency-modification slots.

In illustrative embodiment, the at least one first-frequency-modification slot of each first frequency blade may be spaced apart from a leading edge and from a trailing edge of the first frequency blade. In some embodiments, the at least one second-frequency-modification slot of each second frequency blade may be spaced apart from a leading edge and a trailing edge of the second frequency blade.

In illustrative embodiments, each of the first frequency blades may be formed to include two first-frequency-modification slots that are spaced-apart from one another. The first-frequency-modification slots and the second-frequency-modification slots may be blind slots with one open end and one closed end. The closed ends of the first-frequency-modification slots and the second-frequency-modification slots may be contoured.

According to another aspect of the present disclosure, a rotor for use in a gas turbine engine may include a central wheel arranged around a central axis, a plurality of first frequency blades that extend outward from the central wheel in a radial direction away from the central axis, and a plurality of second frequency blades that extend outward from the central wheel in the radial direction away from the central axis. Each of the second frequency blades may be arranged circumferentially between two first frequency blades.

In illustrative embodiments, each of the first frequency blades may be formed to include at least one first-frequency-modification slot that extends inward in the radial direction from a radially-outward tip of the first frequency blade toward the central wheel. The at least one first-frequency-modification slots may be sized and located so that the natural frequency of one low order mode of each of the first frequency blades is not equal to the natural frequency of the same low order mode of each of the second frequency blades.

In illustrative embodiments, the first-frequency-modification slots may be blind slots with one open end and one closed end. The closed ends of the first-frequency-modification voids may be contoured.

According to another aspect of the present disclosure, a rotor for use in a gas turbine engine may include a central wheel, a plurality of first frequency blades, and a plurality of second frequency blades. The central wheel may be arranged around a central axis. The plurality of first frequency blades may extend outward from the central wheel in a radial direction away from the central axis. The plurality of second frequency blades may extend outward from the central wheel in the radial direction away from the central axis.

In illustrative embodiments, each of the first frequency blades may be formed to include at least one first-frequency-modification void. Each of the second frequency blades may be formed to include at least one second-frequency-modification void, different from the at least one first-frequency-modification void. The at least one first-frequency-modification void and the at least one second-frequency-modification void may be sized and located so that the natural frequency of one low order mode of each of the first frequency blades is not equal to the natural frequency of the same low order mode of each of the second frequency blades.

In illustrative embodiments, the at least one first-frequency-modification void and the at least one second-frequency-modification void may be sized and located so that the natural frequency of the other low order modes of each of the first frequency blades is substantially equal to the natural frequency of the same low order modes of each of the second frequency blades.

In illustrative embodiments, the first-frequency-modification voids may be blind slots with one open end and one closed end. The closed ends of the first-frequency-modification voids may be contoured. The open ends of the first-frequency-modification voids may be arranged along tips of the corresponding first frequency blades. The first frequency blades may each include two first-frequency-modification voids.

According to another aspect of the present disclosure, method of making a component for a gas turbine engine is disclosed. The method may include the steps of manufacturing a plurality of substantially identical blades, machining a first subset of the substantially identical blades to include at least one first-frequency-modification slot that extends inward into the blades from a tip of blades to provide a plurality of first frequency blades, and machining a second subset of the substantially identical blades to include at least one second-frequency-modification slot, different from the at least one first-frequency-modification slot, that extends inward into the blades from a tip of blades to provide a plurality of second frequency blades.

In illustrative embodiments, the method may include the step of coupling the plurality of first frequency blades and the plurality of second frequency blades to a central wheel. The coupling may result in each of the first frequency blades being arranged between two second frequency blades.

These and other features of the present disclosure will become more apparent from the following description of the illustrative embodiments.

BRIEF DESCRIPTION OF THE DRAWINGS

FIG. 2 is a side elevation view of one first frequency blade included in the fan rotor of FIG. 1 showing that the first frequency blade is formed to include two frequency-modification-slots that extend inwardly from a tip of the blade;

FIG. 3 is a top plan view of the first frequency blade of FIG. 2 showing that the slots are spaced apart from leading and trailing edges of the first frequency blade;

FIG. 4 is a side elevation view of one second frequency blade included in the fan rotor of FIG. 1 showing that the second frequency blade is formed to include a single frequency-modification-slot that extends inwardly from a tip of the blade; and FIG. 5 is a top plan view of the second frequency blade of FIG. 4 showing that the slot is spaced apart from leading and trailing edges of the second frequency blade.

DETAILED DESCRIPTION OF THE DRAWINGS

Figure 1:
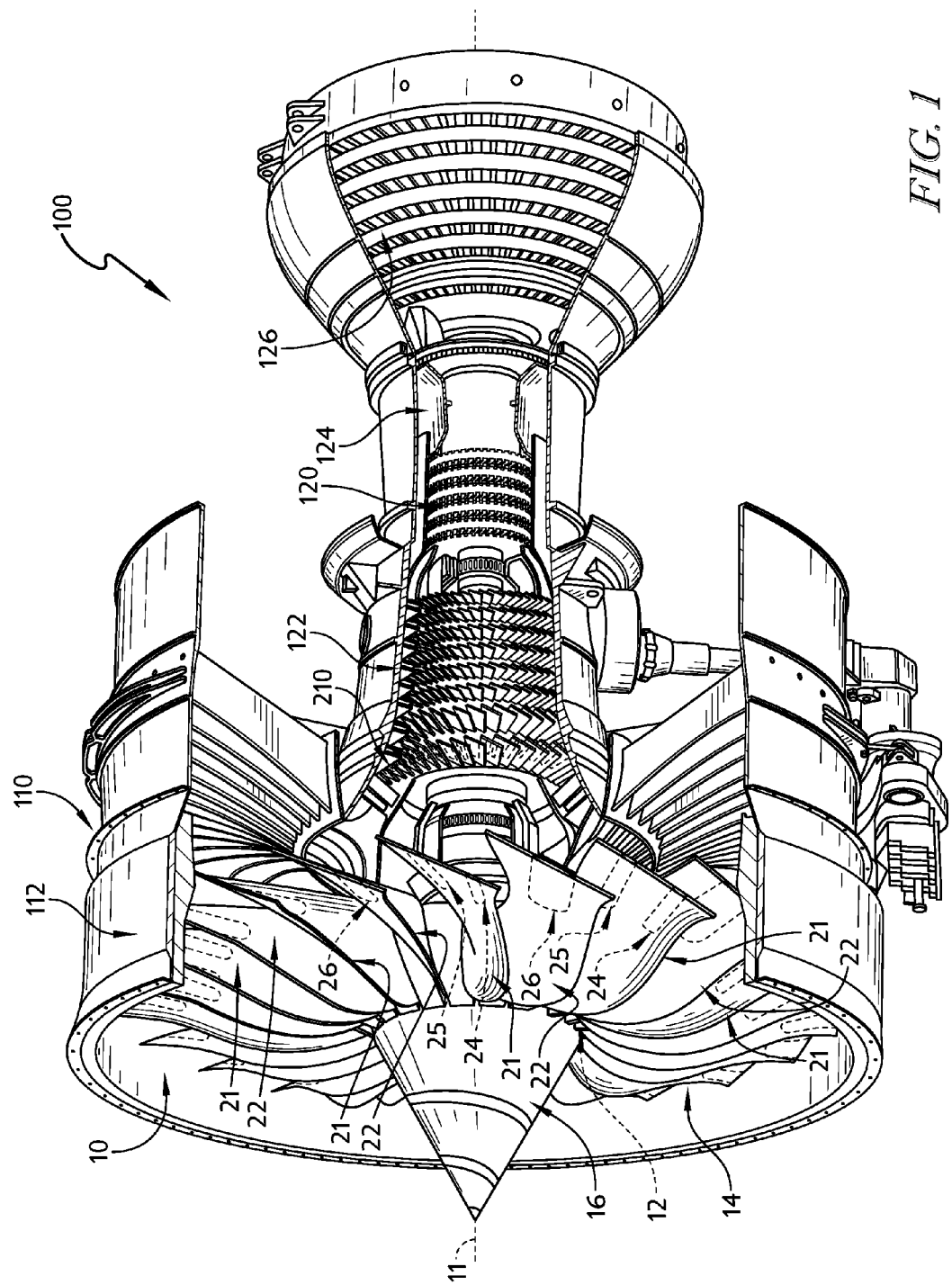
FIG. 1 is a perspective view of a gas turbine engine cut away to show that the gas turbine engine includes a fan and a core coupled to the fan and showing that the fan includes a rotor having blades formed to include frequency-modification-slots that extend inwardly from the tips of the blades.

For the purposes of promoting an understanding of the principles of the disclosure, reference will now be made to a number of illustrative embodiments illustrated in the drawings and specific language will be used to describe the same.

An illustrative aerospace gas turbine engine 100 includes a fan assembly 110 adapted to accelerate/blow air so that the air provides thrust for moving an aircraft as shown in FIG. 1. The illustrative fan assembly 110 includes a fan rotor 10 that rotates about a central axis 11 and a fan case 112 mounted to extend around the fan rotor 10. The fan rotor 10 is illustratively designed to reduce flutter effects induced into the fan rotor 10 during operation of the gas turbine engine 100.

The fan rotor 10 includes a central fan wheel 12, a plurality of fan blades 14, and a spinner 16 as shown, for example, in FIG. 1. The central fan wheel 12 is arranged around the axis 11. The plurality of fan blades 14 extend outwardly from the central fan wheel 12 in the radial direction away from the axis 11. The spinner 16 is coupled to the central fan wheel 12 and directs air radially-outward from the axis 11 toward the plurality of fan blades 14 so that the fan blades 14 can accelerate/blow the air.

In the illustrative embodiment, the plurality of fan blades 14 are divided into a set of first frequency blades 21 and a set of second frequency blades 22 as shown in FIG. 1. Each of the first frequency blades 21 and the second frequency blades 22 are similarly sized. However, the first frequency blades 21 and the second frequency blades 22 are formed to include different frequency-modification slots 24, 25, 26 extending into the blades 21, 22 that adjust the natural frequencies of the first frequency blades 21 and the second frequency blades 22 to reduce flutter effects induced into the fan rotor 10 during operation of the gas turbine engine 100.

The first frequency blades 21 are each illustratively arranged between two circumferentially adjacent second frequency blades 22 as shown in FIG. 1. Similarly, the second frequency blades 22 are each illustratively arranged between two circumferentially adjacent first frequency blades 21.

The fan rotor 10 is illustratively mounted to a turbine engine core 120 to be rotated by the engine core 120 as suggested, for example, in FIG. 1. The engine core 120 includes a compressor 122, a combustor 124, and a turbine 126 all mounted to a case 128. The compressor 122 is configured compress and deliver air to the combustor 124. The combustor 124 is configured to mix fuel with the compressed air received from the compressor 122 and to ignite the fuel. The hot high pressure products of the combustion reaction in the combustor 124 are directed into the turbine 126 and the turbine 126 extracts work to drive the compressor 122 and the fan rotor 10.

One of the illustrative first frequency fan blades 21 included in the fan rotor 10 is shown, for example, in FIGS. 2 and 3. The first frequency fan blade 21 illustratively includes an airfoil 30, a root 32, and a platform 34. The airfoil 30 has an aerodynamic shape for accelerating/blowing air. The root 32 is shaped to be received in a corresponding receiver formed in the central fan wheel 12 to couple the first frequency fan blade 21 to the fan wheel 12. The platform 34 connects the root 12 to the airfoil 16 and separates the root 32 from the airfoil 30 so that gasses passing over the airfoil 30 are blocked from moving down around the root 32 as suggested in FIG. 1. In other embodiments, the airfoil 30 may be integrally coupled to the central wheel 12 during manufacturing such that the fan rotor 10 is a bladed disk (blisk).

The first frequency fan blade 21 has a notional first bend mode node line 36 that extends axially the airfoil 30 from a leading edge 31 to a trailing edge 33 of the airfoil 30 adjacent to the platform 34 as shown in FIG. 2. The first frequency fan blade 21 also has a notional second bend mode node line 37 that extends axially across the airfoil 30 from the leading edge 31 to the trailing edge 33 of the airfoil 30 and that is spaced apart from the platform 34. The first frequency fan blade 21 also has notional third bend node lines (not shown) that extend axially across the airfoil 30 from the leading edge 31 to the trailing edge 33 of the airfoil 30 and that are spaced apart from the platform 34. The first frequency fan blade 21 further has a notional first torsion node line 39 that extends radially along the airfoil 30. Generally, the first, second, and third bend modes along with the first torsion mode make up low order modes that affect the first frequency fan blade 21. Other modes, e.g. other bend and torsion modes, may be included in the low order modes of a blade other embodiments.

The first frequency blade 21 is formed to include two first-frequency-modification slots 24, 25 as shown in FIGS. 2 and 3. The two first-frequency-modification slots 24, 25 each extend inward in the radial direction from a radially-outer tip 35 of the airfoil 30 included in the first frequency blade 21. Each of the first-frequency-modification slots 24, 25 are blind slots that include an open end 42, a closed end 44, and a side wall 46 interconnecting the ends 42, 44. The open end 37 of each of the first-frequency-modification slots 24, 25 is illustratively elongated and rounded into an oval shape having no sharp corners. The closed end 44 of each of the first-frequency-modification slots 24, 25 is contoured into an elongated bowl shape having no sharp corners. The open end 42 and the closed end 44 may also be chamfered or rounded at their transitions to the side wall 46. In the illustrative embodiment, the first-frequency-modification slots 24, 25 are spaced apart from the notional first torsion node line 39, from the leading edge 31 and the trailing edge 33 of the first frequency blade 21 as shown in FIG. 2.

One of the illustrative second frequency fan blades 22 included in the fan rotor 10 is shown, for example, in FIGS. 4 and 5. The second frequency fan blade 21 (like the first frequency fan blade 21) includes an airfoil 30, a root 32, and a platform 34. The airfoil 30 has an aerodynamic shape for accelerating/blowing air. The root 32 is shaped to be received in a corresponding receiver formed in the central fan wheel 12 to couple the first frequency fan blade 21 to the fan wheel 12. The platform 34 connects the root 12 to the airfoil 16 and separates the root 32 from the airfoil 30 so that gasses passing over the airfoil 30 are blocked from moving down around the root 32 as suggested in FIG. 1. In other embodiments, the airfoil 30 may be integrally coupled to the central wheel 12 during manufacturing such that the fan rotor 10 is a bladed disk (blisk).

The second frequency fan blade 22 has a notional first bend mode node line 36 that extends axially the airfoil 30 from a leading edge 31 to a trailing edge 33 of the airfoil 30 adjacent to the platform 34 as shown in FIG. 2. The second frequency fan blade 22 also has a notional second bend mode node line 37 that extends axially across the airfoil 30 from the leading edge 31 to the trailing edge 33 of the airfoil 30 and that is spaced apart from the platform 34. The second frequency fan blade 22 also has notional third bend mode node lines (not shown) that extend axially across the airfoil 30 from the leading edge 31 to the trailing edge 33 of the airfoil 30 and that are spaced apart from the platform 34. The second frequency fan blade 22 further has a notional first torsion node line 39 that extends radially along the airfoil 30. Generally, the first, second, and third bend modes along with the first torsion mode make up low order modes that affect the second frequency fan blade 22. Other modes, e.g. other bend and torsion modes, may be included in the low order modes of a blade other embodiments.

The second frequency blade 22 is unlike the first frequency fan blade 21 in that the second frequency fan blade 22 is formed to include a single second-frequency-modification slot 26 as shown in FIGS. 4 and 5. The second-frequency-modification slot 26 extends inward in the radial direction from a radially-outer tip 35 of the airfoil 30 included in the second frequency blade 22. The second-frequency-modification slot 26 is a blind slot that includes an open end 42, a closed end 44, and a side wall 46 interconnecting the ends 42, 44. The open end 42 of the second-frequency-modification slot 26 is illustratively elongated and rounded into an oval shape having no sharp corners. The closed end 44 of each of the second-frequency-modification slot 26 is contoured into an elongated bowl shape having no sharp corners. The open end 42 and the closed end 44 may also be chamfered or rounded at their transitions to the side wall 46. In the illustrative embodiment, the second-frequency-modification slot 26 is arranged along the notional first torsion node line 39 but is spaced apart from the leading edge 31 and the trailing edge 33 of the second frequency blade 22 as shown in FIG. 4.

The illustrative the frequency-modification slots 24, 25, 26 are sized and located so that the natural frequency of one low order mode of the first frequency blades 21 is not equal to the natural frequency of the same low order mode of the second frequency blades 22. Further, the frequency-modification slots 24, 25, 26 are sized and located so that so that the natural frequency of the other low order modes of the first frequency blades 21 is equal to the natural frequency of the same low order modes of the second frequency blades 22.

In the particular embodiment shown in FIGS. 1-5, the frequency-modification slots 24, 25, 26 are sized and located so that the natural frequency of the first torsional mode of each of the first frequency blades 21 is not equal to the natural frequency of the first torsional mode of each of the second frequency blades 22. Further, the frequency-modification slots 24, 25, 26 are sized and located so that the natural frequency of the low order bend modes of each of the first frequency blades 21 is equal to the natural frequency of the first bend mode of each of the second frequency blades 22.

In other embodiments, the frequency-modification slots 24, 25, 26 are sized and located so that the natural frequency of the first bend mode of each of the first frequency blades 21 is not equal to the natural frequency of the first bend mode of each of the second frequency blades 22. Further, the frequency-modification slots 24, 25, 26 are sized and located so that the natural frequency of the other low order bend modes and the first torsion mode of each of the first frequency blades 21 is equal to the natural frequency of the bend modes and first torsion mode of each of the second frequency blades 22. In still other embodiments, other individual modes may be mistuned between the first frequency blades and the second frequency blades while maintaining tuning in other modes.

In some embodiments, frequency modification slots 24, 25 may be incorporated into only the first-frequency blades 21 and not into the second-frequency blades 22. In such embodiments, the frequency-modification slots 24, 25 are sized and located so that the natural frequency of at least one low order mode of each of the first frequency blades 21 is not equal to the natural frequency of the same low order mode of each of the second frequency blades 22. However, the natural frequency of the other low order modes of each of the first frequency blades 21 may not be equal to the natural frequency of the other low order modes of each of the second frequency blades 22.

Mistuning or mismatching of natural frequency of one or more selected modes of the first frequency blades 21 relative to the second frequency blades 22 may change the aerodynamic damping in each of the plurality of fan blades 14. The change in aero damping will benefit the flutter and forced response behavior in the operating envelope of the fan 110.

The reduction of flutter or reduction in forced response may allow for reduced engine weight because higher fan blade aerodynamic loading can be used which may lead to lower fan diameter for a given thrust. This is because the operating line can be raised obtaining thrust by higher pressure ratio instead of flow. Reduction of engine weight can contribute to improvements in fuel efficiency of a particular gas turbine engine.

Also, keeping the first bending, second bending, and third bending modes tuned in the first embodiment or keeping the first torsion mode tuned in the second embodiment may avoid the peak in amplification factor associated with mistuning. Any mistuned mode would be designed to avoid the peak amplification factor associated with mistuning by having sufficient frequency separation between the first and second frequency blades.

In other embodiments of the fan rotor 10, various numbers and arrangements of frequency-modification slots or other voids may be used to adjust the natural frequencies of the plurality of fan blades 14 included in the fan rotor 10. In some such embodiments, the slots or voids may be sized and located to achieve natural frequency adjustment similar to that provided by the frequency-modification slots 24, 25, 26. In other such embodiments, the slots or voids may be sized and located to achieve other natural frequency adjustments. For example, by including four slots or voids four modes could be tuned.

In some embodiments, one or more of the slots or voids formed in the plurality of fan blades 14 may be partially or fully filled with plugs (not shown). The plugs may be filled with material having a density greater than the density of the airfoils 30 included in the first frequency fan blades 21 and the second frequency fan blades 22. In some such embodiments, the weight and location of the plugs may be predetermined to achieve natural frequency adjustment similar to that provided by the frequency-modification slots 24, 25, 26.

One method of making the fan rotor 10 may include manufacturing a plurality of substantially identical blades and then machining those substantially identical blades into the first and second frequency blades 21, 22. More specifically, the method may include machining a first subset of the substantially identical blades to include two first-frequency-modification slots 24, 25 that extend inward into the blades from a tip 35 of blades to provide the plurality of first frequency blades 21. The method may also include machining a second subset of the substantially identical blades to include a single second-frequency-modification slot 26, sized and located differently from the first-frequency-modification slots 24, 25, that extends inward into the blades from a tip 35 of blades to provide the plurality of second frequency blades 22. Machining the slots 24, 25, 26 may be performed by an electrical discharge machining (EDM) mill operation and may utilize a contoured electrode shaped to produce the contoured closed end 44 of the slots 24, 25, 26.

The method may also include coupling the plurality of first frequency blades 21 and the plurality of second frequency blades 22 to the central fan wheel 12 so that each of the first frequency blades 21 is arranged between two second frequency blades 22. In some embodiments, coupling the first frequency blades 21 and the plurality of second frequency blades 22 to the central wheel 12 may be performed by sliding roots 34 of the blades 21, 22 into corresponding receivers formed by the central fan wheel 21 and attaching a retainer to the central fan wheel 34. In other embodiments, coupling the first frequency blades 21 and the plurality of second frequency blades 22 to the central wheel 12 may be performed by machining the fan blades 21, 22 from material integral with the central fan wheel 12 or by bonding the fan blades 21, 22 with the central fan wheel 12 to form a blisk.

According to the present disclosure, rotors for various parts of a gas turbine engine such as compressors and turbines may be provided that are less susceptible to damage as a result of flutter or forced response effects. For example, a compressor rotor 210 included in the 122 of the gas turbine engine 100 illustratively includes a central compressor wheel 212 and a plurality of compressor blades 214 as shown in FIG. 1. The compressor blades 214 are formed to include slots that are similar to the slots 24, 25, 26 formed in the fan blades 14 discussed above in form and effect. Therefore the foregoing description of the fan rotor 10 including slots 24, 25, 26 is incorporated by reference to apply to the compressor rotor 210, except where it conflicts with the specific description and/or drawings of the compressor rotor 210 herein.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A rotor for use in a gas turbine engine, the rotor comprising
a central wheel arranged around a central axis,
a plurality of first frequency blades that extend outward from the central wheel in a radial direction away from the central axis, each of the first frequency blades formed to include two first-frequency-modification slots that extend inward in the radial direction from a radially-outward tip of the first frequency blade toward the central wheel, and
a plurality of second frequency blades that extend outward from the central wheel in the radial direction away from the central axis, each of the second frequency blades arranged circumferentially between two first frequency blades and formed to include one second-frequency-modification slot, the second-frequency-modification slot different from the two first-frequency-modification slots, that extends inward in the radial direction from a radially-outward tip of the second frequency blade toward the central wheel,
wherein the two first-frequency-modification slots are sized and located to be spaced apart from a torsion node line included in each of the first frequency blades and the one second-frequency-modification slot is arranged along a torsion node line included in each of the second frequency blades so that the natural frequency of one low order mode of each of the first frequency blades is not equal to the natural frequency of the same low order mode of each of the second frequency blades.

2. The rotor of claim 1, wherein each of the first frequency blades includes a first airfoil having a first aerodynamic profile between a leading edge and a trailing edge of the first airfoil, each of the second frequency blades includes a second airfoil having a second aerodynamic profile between a leading edge and a trailing edge of the second airfoil, and the first aerodynamic profile is substantially the same as the second aerodynamic profile.

3. The rotor of claim 2, wherein each of the first frequency blades and each of the second frequency blades are substantially identical except for the first-frequency-modification slots and the second-frequency-modification slot.

4. The rotor of claim 1, wherein the two first-frequency-modification slots of each first frequency blade are spaced apart from a leading edge and from a trailing edge of the first frequency blade.

5. The rotor of claim 4, wherein the second-frequency-modification slot of each second frequency blade is spaced apart from a leading edge and a trailing edge of the second frequency blade.

6. The rotor of claim 1, wherein the first-frequency-modification slots are blind slots with one open end and one closed end.

7. The rotor of claim 6, wherein the closed ends of the first-frequency-modification slots are contoured.

8. The rotor of claim 6, wherein the open ends of the first-frequency-modification slots are arranged along tips of the corresponding first frequency blades.

9. The rotor of claim 1, wherein the first-frequency-modification slots are elongated and rounded into an oval shape having no sharp corners.

* * * * *